(No Model.)
H. M. HOLIDAY.
THILL COUPLING.
No. 286,439.          Patented Oct. 9, 1883.
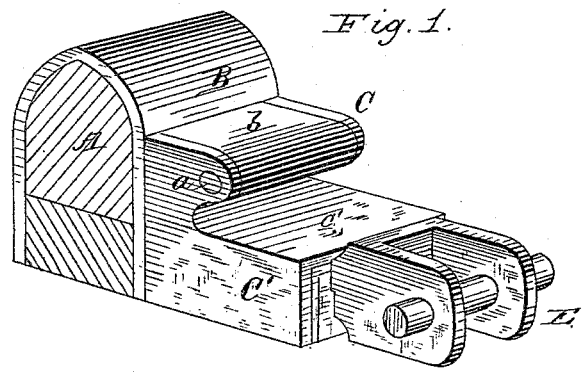
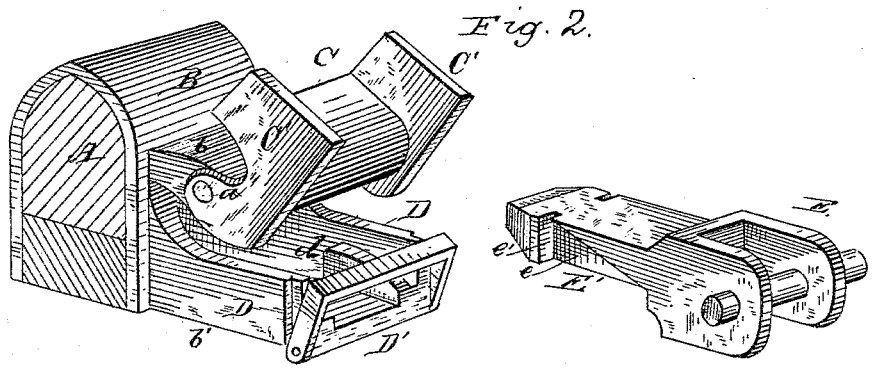
Witnesses:
EW Johnson
L C Hills
Inventor:
Henry M. Holiday
Attorney

UNITED STATES PATENT OFFICE.

HENRY M. HOLIDAY, OF OLIVET, MICHIGAN.

THILL-COUPLING.

SPECIFICATION forming part of Letters Patent No. 286,439, dated October 9, 1883.

Application filed July 7, 1883. (No model.)

*To all whom it may concern:*

Be it known that I, HENRY M. HOLIDAY, a citizen of the United States of America, residing at Olivet, in the county of Eaton and State of Michigan, have invented certain new and useful Improvements in Thill and Pole Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in thill-couplings, its object being to provide a means whereby the thills can be readily and securely attached to the axle and easily removed therefrom; and to this end my invention consists in the construction and arrangement of the parts, as will be hereinafter more fully set forth, and pointed out in the claims.

In the annexed drawings, which illustrate my invention, Figure 1 is a perspective view, showing the parts attached to each other; and Fig. 2 is a perspective view, showing the parts detached.

A represents the axle of a vehicle, and B the clip, which is provided with forward projections, $b\ b'$. The upper forward projection, $b$, is provided with a perforation through which passes a suitable pin or bolt, $a$, which passes through the upper projecting end of the cover C. This cover is provided with side wings, C' C', which are united to each other at their top by the cover $c'$. The lower projecting portion of this clip $b'$ is constructed so that it will be entirely covered by the cover C, with the exception of its forward end and lower side, so as to prevent the access of dust thereto. This lower portion of my improved thill-coupling is open at its forward end, and is provided with raised sides D and a closed bottom, D'. On the inner side are formed side projecting walls $d$, which are inclined from their front ends toward the rear, and correspond in shape with the recessed portion of the end of the bar E'.

The portion E of my improved thill-coupling is bifurcated at its outer end for the reception of the thill-irons, which are pivoted thereto, and on its opposite end it is provided with rearwardly-projecting portion E', which is provided with recesses on its side, as shown at $e$, which are tapered on their upper edges, and are provided with rear walls, $e'$. These recesses fit over the projection $d$ of the socket D.

When it is desired to attach a pole or thill to the axle of a vehicle, when the parts are provided with my improved attachment, it is only necessary to raise the cover C and place the part E within the socket D, after which the cover C is lowered, and the parts will be held securely in place and cannot be detached unless the cover C is raised.

It will be noticed in my invention that as soon as the cover is raised the weight of the thill will cause the draft-bar E to be depressed at its outer end. Thus it is disconnected; and if it is desirable to use this invention as a horse-detacher, it will be only necessary to provide the cover C with a connecting means, so that it can be raised from the vehicle, and when it is raised the parts will be detached.

If desirable, I may provide the open end of the box or socket D with a swinging loop or band, which will be pivoted to the lower portion of the same, and will extend over or clasp the draft-bar E, so as to prevent motion of said bar in its socket or box, and the exterior of the socket D may be recessed for the reception of said loop, as is fully shown in the annexed drawings.

Having thus described my invention, I do not wish to confine myself to the precise construction herein described, but reserve the right to vary the same within the scope of my claim without departing from the spirit of my invention.

What I claim as new, and desire to secure by Letters Patent, is—

1. In a coupling, as herein described, the pivoted cover C, having top and side wings, and recessed stationary portion D, with inner catches or projections, $d$, and draft-bar E, with recesses $e$, the parts being organized and combined substantially as shown, and for the purpose set forth.

2. In a thill-coupling, the socket or box D, having an open top and end, and provided on its inner side with side projecting lugs, $d$, having rear vertical ends, and draft-bar E, with projecting portion E', having side recesses, $e$, and cover C, pivoted above the same, the parts being combined and organized substantially as shown, and for the purpose set forth.

In testimony whereof I affix my signature in presence of two witnesses.

HENRY M. HOLIDAY.

Witnesses:
   GEO. WEVER,
   G. W. KEYES.